United States Patent
Maes

(10) Patent No.: US 9,038,082 B2
(45) Date of Patent: *May 19, 2015

(54) RESOURCE ABSTRACTION VIA ENABLER AND METADATA

(75) Inventor: Stéphane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 316 days.

This patent is subject to a terminal disclaimer.

(21) Appl. No.: 13/029,219

(22) Filed: Feb. 17, 2011

(65) Prior Publication Data

US 2012/0047506 A1 Feb. 23, 2012

Related U.S. Application Data

(63) Continuation-in-part of application No. 12/490,540, filed on Jun. 24, 2009.

(60) Provisional application No. 61/305,293, filed on Feb. 17, 2010, provisional application No. 61/075,823, filed on Jun. 26, 2008.

(51) Int. Cl.
  *G06F 9/46* (2006.01)
  *G06F 9/54* (2006.01)

(52) U.S. Cl.
  CPC ............... *G06F 9/541* (2013.01); *G06F 9/545* (2013.01)

(58) Field of Classification Search
  USPC ............... 715/210; 717/120, 169; 707/200, 3; 709/221, 203–204, 226; 718/104–105; 719/315
  See application file for complete search history.

(56) References Cited

U.S. PATENT DOCUMENTS

| 5,414,812 A | 5/1995 | Filip et al. |
| 5,613,060 A | 3/1997 | Britton et al. |

(Continued)

FOREIGN PATENT DOCUMENTS

| EP | 2 034 748 A1 | 3/2009 |
| WO | WO 2007134468 A1 | 11/2007 |

(Continued)

OTHER PUBLICATIONS

Maffioletti, S. et al. "Automatic resource and service management for ubiquitous computing environments." 2004. Pervasive Computing and Communications Workshops. Proceedings of the Second IEEE Annual Conference on. IEEE.*

(Continued)

*Primary Examiner* — Lewis A Bullock, Jr.
*Assistant Examiner* — Gilles Kepnang
(74) *Attorney, Agent, or Firm* — Kilpatrick Townsend & Stockton LLP

(57) ABSTRACT

Embodiments of the invention provide systems and methods for managing an enabler and dependencies of the enabler. According to one embodiment, a method of managing an enabler can comprise requesting a management function via a management interface of the enabler. The management interface can provide an abstraction of one or more management functions for managing the enabler and/or dependencies of the enabler. In some cases, prior to requesting the management function metadata associated with the management interface can be read and a determination can be made as to whether the management function is available or unavailable. Requesting the management function via the management interface of the enabler can be performed in response to determining the management function is available. In response to determining the management function is unavailable, one or more alternative functions can be identified based on the metadata and the one or more alternative functions can be requested.

11 Claims, 8 Drawing Sheets

(56) References Cited

U.S. PATENT DOCUMENTS

| | | | |
|---|---|---|---|
| 5,699,513 A | 12/1997 | Feigen et al. | |
| 5,737,321 A | 4/1998 | Takahashi | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A | 12/2000 | Ejiri | |
| 6,192,231 B1 | 2/2001 | Chapman et al. | |
| 6,192,414 B1 | 2/2001 | Horn | |
| 6,230,271 B1 | 5/2001 | Wadlow et al. | |
| 6,272,556 B1 | 8/2001 | Gish | |
| 6,275,857 B1 | 8/2001 | McCartney | |
| 6,336,138 B1 | 1/2002 | Caswell et al. | |
| 6,374,305 B1 | 4/2002 | Gupta et al. | |
| 6,466,984 B1 | 10/2002 | Naveh et al. | |
| 6,496,864 B1 | 12/2002 | McCartney | |
| 6,553,108 B1 | 4/2003 | Felger | |
| 6,578,159 B1 | 6/2003 | Kitagawa et al. | |
| 6,611,812 B2 | 8/2003 | Hurtado et al. | |
| 6,633,560 B1 | 10/2003 | Tiwari et al. | |
| 6,748,570 B1 * | 6/2004 | Bahrs et al. | 715/210 |
| 6,792,605 B1 | 9/2004 | Roberts et al. | |
| 6,813,278 B1 | 11/2004 | Swartz et al. | |
| 6,823,338 B1 | 11/2004 | Byrne et al. | |
| 6,868,413 B1 | 3/2005 | Grindrod et al. | |
| 6,965,902 B1 | 11/2005 | Ghatate | |
| 6,978,348 B2 | 12/2005 | Belknap et al. | |
| 6,981,023 B1 | 12/2005 | Hamilton et al. | |
| 6,985,939 B2 | 1/2006 | Fletcher et al. | |
| 6,990,491 B2 | 1/2006 | Dutta et al. | |
| 7,003,578 B2 | 2/2006 | Kanada et al. | |
| 7,042,988 B2 | 5/2006 | Juitt et al. | |
| 7,043,538 B2 | 5/2006 | Guedalia et al. | |
| 7,051,092 B2 * | 5/2006 | Lenz et al. | 709/221 |
| 7,072,653 B1 | 7/2006 | Sladek et al. | |
| 7,073,055 B1 | 7/2006 | Freed et al. | |
| 7,089,317 B2 | 8/2006 | Jeyaraman et al. | |
| 7,092,385 B2 | 8/2006 | Gallant et al. | |
| 7,106,848 B1 | 9/2006 | Barlow et al. | |
| 7,111,060 B2 | 9/2006 | Araujo et al. | |
| 7,114,146 B2 | 9/2006 | Zhang et al. | |
| 7,114,148 B2 | 9/2006 | Irving et al. | |
| 7,133,669 B2 | 11/2006 | Nair et al. | |
| 7,143,094 B2 | 11/2006 | Arroyo et al. | |
| 7,146,616 B2 | 12/2006 | Dorner et al. | |
| 7,185,333 B1 * | 2/2007 | Shafron | 717/173 |
| 7,185,342 B1 | 2/2007 | Carrer et al. | |
| 7,194,482 B2 | 3/2007 | Larkin et al. | |
| 7,222,148 B2 | 5/2007 | Potter et al. | |
| 7,222,334 B2 | 5/2007 | Casati et al. | |
| 7,266,600 B2 * | 9/2007 | Fletcher et al. | 709/223 |
| 7,269,162 B1 | 9/2007 | Turner | |
| 7,272,625 B1 | 9/2007 | Hannel et al. | |
| 7,281,029 B2 | 10/2007 | Rawat | |
| 7,295,532 B2 | 11/2007 | Haller et al. | |
| 7,302,570 B2 | 11/2007 | Beard et al. | |
| 7,340,508 B1 | 3/2008 | Kasi et al. | |
| 7,409,707 B2 | 8/2008 | Swander et al. | |
| 7,411,943 B2 | 8/2008 | Kittredge et al. | |
| 7,415,010 B1 | 8/2008 | Croak et al. | |
| 7,426,381 B2 | 9/2008 | Maes | |
| 7,433,838 B2 | 10/2008 | Welsh et al. | |
| 7,443,972 B1 | 10/2008 | Barlow et al. | |
| 7,444,620 B2 | 10/2008 | Marvin | |
| 7,447,793 B2 | 11/2008 | Morioka | |
| 7,448,022 B1 * | 11/2008 | Ram et al. | 717/120 |
| 7,454,399 B2 | 11/2008 | Matichuk | |
| 7,461,062 B2 | 12/2008 | Stewart et al. | |
| 7,467,384 B2 * | 12/2008 | Brubacher et al. | 718/104 |
| 7,472,349 B1 | 12/2008 | Srivastava et al. | |
| 7,478,416 B2 | 1/2009 | Edson | |
| 7,519,076 B2 | 4/2009 | Janssen et al. | |
| 7,580,994 B1 | 8/2009 | Fiszman et al. | |
| 7,590,696 B1 | 9/2009 | Odell et al. | |
| 7,617,521 B2 | 11/2009 | Maes | |
| 7,630,953 B2 | 12/2009 | Stauber et al. | |
| 7,644,145 B2 * | 1/2010 | Rockwell | 709/223 |
| 7,660,297 B2 | 2/2010 | Fisher et al. | |
| 7,676,813 B2 | 3/2010 | Bisset et al. | |
| 7,702,792 B2 | 4/2010 | Shaffer et al. | |
| 7,716,310 B2 | 5/2010 | Foti | |
| 7,720,926 B2 | 5/2010 | Asahara | |
| 7,730,129 B2 * | 6/2010 | Wang et al. | 709/204 |
| 7,752,634 B1 | 7/2010 | Saxena et al. | |
| 7,779,445 B2 | 8/2010 | Ellis | |
| 7,853,647 B2 | 12/2010 | Maes | |
| 7,860,490 B2 | 12/2010 | Maes | |
| 7,865,607 B2 | 1/2011 | Sonalkar et al. | |
| 7,873,716 B2 | 1/2011 | Maes | |
| 7,904,909 B1 * | 3/2011 | Reiner et al. | 718/104 |
| 7,925,727 B2 | 4/2011 | Sullivan et al. | |
| 7,933,397 B2 | 4/2011 | Jain | |
| 8,023,971 B2 | 9/2011 | Egli | |
| 8,032,920 B2 | 10/2011 | Maes | |
| 8,036,362 B1 | 10/2011 | Skinner | |
| 8,060,067 B2 | 11/2011 | Tarleton et al. | |
| 8,068,860 B1 | 11/2011 | Midkiff | |
| 8,073,810 B2 | 12/2011 | Maes | |
| 8,086,665 B1 * | 12/2011 | Soukup et al. | 709/203 |
| 8,090,848 B2 | 1/2012 | Maes | |
| 8,114,555 B2 | 2/2012 | Leonida et al. | |
| 8,121,278 B2 | 2/2012 | Leigh et al. | |
| 8,161,171 B2 | 4/2012 | Maes | |
| 8,214,503 B2 | 7/2012 | Maes | |
| 8,223,951 B1 | 7/2012 | Edelhaus et al. | |
| 8,230,449 B2 | 7/2012 | Maes | |
| 8,255,470 B2 | 8/2012 | Jackson et al. | |
| 8,321,498 B2 | 11/2012 | Maes | |
| 8,321,594 B2 | 11/2012 | Maes et al. | |
| 8,335,862 B2 * | 12/2012 | Fletcher et al. | 709/250 |
| 8,370,506 B2 | 2/2013 | Maes | |
| 8,401,022 B2 | 3/2013 | Maes et al. | |
| 8,458,703 B2 | 6/2013 | Maes | |
| 8,505,067 B2 | 8/2013 | Maes | |
| 8,533,773 B2 | 9/2013 | Maes | |
| 8,539,097 B2 | 9/2013 | Maes | |
| 8,543,665 B2 | 9/2013 | Ansari et al. | |
| 8,589,338 B2 | 11/2013 | Maes | |
| 8,675,852 B2 | 3/2014 | Maes | |
| 8,676,155 B2 | 3/2014 | Fan et al. | |
| 8,744,055 B2 | 6/2014 | Maes | |
| 8,879,547 B2 | 11/2014 | Maes | |
| 8,914,493 B2 | 12/2014 | Maes | |
| 2001/0010053 A1 | 7/2001 | Ben-Shachar et al. | |
| 2001/0016880 A1 | 8/2001 | Cai et al. | |
| 2001/0028649 A1 | 10/2001 | Pogossiants et al. | |
| 2002/0002684 A1 | 1/2002 | Fox et al. | |
| 2002/0087674 A1 | 7/2002 | Guilford et al. | |
| 2002/0099738 A1 | 7/2002 | Grant | |
| 2002/0101879 A1 | 8/2002 | Bouret | |
| 2002/0104015 A1 | 8/2002 | Barzilai et al. | |
| 2002/0111848 A1 | 8/2002 | White | |
| 2002/0120729 A1 | 8/2002 | Faccin et al. | |
| 2002/0143819 A1 | 10/2002 | Han et al. | |
| 2002/0144119 A1 | 10/2002 | Benantar | |
| 2002/0178122 A1 | 11/2002 | Maes | |
| 2002/0184373 A1 | 12/2002 | Maes | |
| 2002/0191774 A1 | 12/2002 | Creamer et al. | |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |
| 2003/0003953 A1 | 1/2003 | Houplain | |
| 2003/0004746 A1 | 1/2003 | Kheirolomoom et al. | |
| 2003/0005034 A1 | 1/2003 | Amin | |
| 2003/0023953 A1 | 1/2003 | Lucassen et al. | |
| 2003/0046316 A1 | 3/2003 | Gergic et al. | |
| 2003/0061268 A1 | 3/2003 | Moerdijk et al. | |
| 2003/0061404 A1 | 3/2003 | Atwal et al. | |
| 2003/0115203 A1 | 6/2003 | Brown et al. | |
| 2003/0115260 A1 | 6/2003 | Edge | |

(56) References Cited

U.S. PATENT DOCUMENTS

| | | |
|---|---|---|
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1 | 1/2004 | Fellenstein et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093381 A1* | 5/2004 | Hodges et al. ............... 709/204 |
| 2004/0093593 A1* | 5/2004 | Jhanwar et al. ............... 717/169 |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0048159 A1* | 3/2006 | Yazawa et al. ............... 718/104 |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1* | 8/2007 | Abnous et al. ............... 707/200 |
| 2007/0192465 A1 | 8/2007 | Modarressi |
| 2007/0197227 A1 | 8/2007 | Naqvi et al. |
| 2007/0198982 A1* | 8/2007 | Bolan et al. ............... 718/104 |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1* | 7/2008 | Marvin et al. ............... 718/104 |
| 2008/0168523 A1 | 7/2008 | Ansari et al. |
| 2008/0172482 A1* | 7/2008 | Shah ............... 709/223 |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1* | 8/2008 | Breiter et al. ............... 718/104 |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |

(56) References Cited

U.S. PATENT DOCUMENTS

| | | |
|---|---|---|
| 2008/0235354 A1 | 9/2008 | Maes |
| 2008/0235380 A1 | 9/2008 | Maes |
| 2008/0253543 A1 | 10/2008 | Aharon |
| 2008/0271039 A1* | 10/2008 | Rolia et al. ............ 718/105 |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1 | 11/2008 | Boni et al. |
| 2008/0301135 A1 | 12/2008 | Alves et al. |
| 2008/0307108 A1 | 12/2008 | Yan et al. |
| 2008/0313648 A1* | 12/2008 | Wang et al. ............ 719/315 |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1* | 5/2009 | Bussard et al. ............ 718/104 |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1* | 7/2009 | Arthursson ............ 707/3 |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1* | 9/2009 | Paval ............ 718/104 |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0235844 A1* | 9/2010 | Arwe et al. ............ 718/104 |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0045040 A1 | 2/2012 | Maes |
| 2012/0106728 A1 | 5/2012 | Ghaffari et al. |
| 2012/0173745 A1 | 7/2012 | Maes |

FOREIGN PATENT DOCUMENTS

| | | |
|---|---|---|
| WO | 2008111027 | 12/2008 |
| WO | 2008146097 | 12/2008 |

OTHER PUBLICATIONS

Simon, B. et al. "A simple query interface for interoperable learning repositories". 2005. In Proceedings of the 1st Workshop on Interoperability of Web-based Educational Systems. (pp. 11-18).*

U.S. Appl. No. 11/926,738, filed Oct. 29, 2007, Notice of Allowance mailed Aug. 5, 2011, 13 pages.

U.S. Appl. No. 11/943,101, filed Nov. 20, 2007, Office Action mailed Jul. 28, 2011, 11 pages.

U.S. Appl. No. 11/951,500, filed Dec. 6, 2007, Advisory Action mailed Jul. 15, 2011, 3 pages.

U.S. Appl. No. 11/024,160, filed Dec. 27, 2004, Notice of Allowance dated Aug. 4, 2011, 15 pages.

U.S. Appl. No. 11/939,705, filed Nov. 14, 2007, Office Action mailed Sep. 28, 2011, 15 pages.

U.S. Appl. No. 12/045,220, filed Mar. 10, 2008, Office Action dated Sep. 27, 2011, 20 pages.

U.S. Appl. No. 12/364,642, filed Feb. 3, 2009, Final Office Action dated Jul. 1, 2011, 20 pages.

U.S. Appl. No. 12/364,642, filed Feb. 3, 2009, Advisory Action dated Sep. 16, 2011, 3 pages.

U.S. Appl. No. 11/357,653, filed Feb. 16, 2006, Final Office Action dated Aug. 2, 2011, 19 pages.

U.S. Appl. No. 12/544,459, filed Aug. 20, 2009, Notice of Allowance mailed Aug. 22, 2011, 8 pages.

U.S. Appl. No. 11/949,930, filed Dec. 4, 2007, Office Action mailed Sep. 29, 2011, 19 pages.

U.S. Appl. No. 12/014,387, filed Jan. 15, 2008, Office Action mailed Sep. 7, 2011, 18 pages.

U.S. Appl. No. 12/018,718, filed Jan. 23, 2008, Office Action mailed Jun. 22, 2011, 23 pages.

U.S. Appl. No. 12/019,299, filed Jan. 24, 2008, Final Office Action mailed Aug. 25, 2011, 20 pages.

Author Unknown, "Assuring Quality of Experience for IPTV—White Paper," Heavy Reading, Jul. 2006, 18 pages.

Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.

Dhesikan, "Quality of Service for IP Videoconferencing—Engineering White Paper," Cisco Systems, Jun. 1, 2001, 16 pages.

U.S. Appl. No. 11/943,101, filed Nov. 20, 2007, Notice of Allowance mailed Dec. 9, 2011, 7 pages.

U.S. Appl. No. 12/019,335, filed Jan. 24, 2008 Final Office Action mailed Dec. 5, 2011, 19 pages.

U.S. Appl. No. 12/364,642, filed Feb. 3, 2009, Office Action dated Oct. 18, 2011, 21 pages.

U.S. Appl. No. 11/357,653, filed Feb. 16, 2006, Advisory Action dated Oct. 12, 2011, 3 pages.

U.S. Appl. No. 12/544,471, filed Aug. 20, 2009, Office Action dated Jan. 6, 2012, 8 pages.

U.S. Appl. No. 12/544,484, filed Aug. 20, 2009, Final Office Action dated Dec. 1, 2011, 8 pages.

U.S. Appl. No. 11/969,343, filed Jan. 4, 2008, Final Office Action mailed Oct. 21, 2011, 11 pages.

U.S. Appl. No. 11/969,343, filed Jan. 4, 2008, Advisory Action mailed Jan. 5, 2012, 3 pages.

U.S. Appl. No. 11/939,705, filed Nov. 14, 2007, Advisory Action mailed Jun. 1, 2012, 9 pages.

U.S. Appl. No. 11/939,705, filed Nov. 14, 2007, Office Action mailed Jul. 6, 2012, 13 pages.

U.S. Appl. No. 12/045,220, filed Mar. 10, 2008, Advisory Action dated May 31, 2012, 3 pages.

U.S. Appl. No. 12/364,642, filed Feb. 3, 2009, Final Office Action dated Jun. 19, 2012, 24 pages.

U.S. Appl. No. 11/357,653, filed Feb. 16, 2006, Office Action dated Apr. 26, 2012, 18 pages.

(56) References Cited

OTHER PUBLICATIONS

U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/024,060, Dec. 27, 2004, Maes.
Andrews, Tony et al., Business Process Execution Language for Web Services, Version 1.1, BEA Systems, International Business Machines Corporation, SAP AG, Siebel Systems, May 5, 2003, 31 pages.
Burger, E. et al., "Deploying CCXML for Application-Layer Call Control," Aug. 2006, 11 pages.
International Search Report and Written Opinion of PCT/US2010/037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.
Maes, Stephane, Multi-modal Web IBM Position W3C/WAP Workshop, IBM Research Human Language Technologies, http://www.w3.org, accessed May 26, 2003, 9 pages.

Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet," <http://java.sun.com/products/jain/JSLEE-SIPServlet.pdf, 2003, 13 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, http://www.linktionary.com/policy.html, accessed Aug. 2, 2004, 4 pages.
Romellini, C. et al., "CCXML: The Power of Standardization," Loquendo, Sep. 27, 2005, 7 pages.
Seely, Scott, "XML and Web Services Security: Understanding WS-Security," Microsoft Corporation, 2002, 11 pages.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm, accessed May 26, 2003, 5 Pages.
Sundsted, Todd E., With Liberty and single sign-on for all, The Liberty Alliance Project seeks to solve the current online identity crisis Java World, www.javaworld.com/javaworld/jw-02-2002/jw-0215-liberty.html, accessed May 26, 2003, 7 pages.
The Parlay Group, "Specifications," <http://web.archive.org/web/20050114014707/www.parlay.org/specs/index.asp>, Jan. 14, 2005, 2 pages.
Thomas, Ann M., "Registering a Web Service in UDDI," SOA World Magazine, Sep. 26, 2003, 9 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/848,347, filed Aug. 31, 2007, Office Action mailed Sep. 30, 2010, 19 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129 filed, Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed 2/24/010, 12 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Office Action mailed Aug. 27, 2010, 11 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.

(56) References Cited

OTHER PUBLICATIONS

U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Office Action mailed Sep. 1, 2010, 30 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 10/855,999, filed May 28, 2004, Final Office Action dated Jan. 5, 2011, 19 pages.
U.S. Appl. No. 10/855,999, filed May 28, 2004, Advisory Action dated Mar. 16, 2011, 3 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005 Office Action dated Aug. 5, 2008, 18 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 17, 2011, 21 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/019,335, filed Jan. 24, 2008, Office Action mailed May 23, 2011, 18 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299 filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
Wikipedia, "Parlay," <http://web.archive.org/web/20050130172632/en.wikipedia.org/wiki/Parlay>, Jan. 30, 2005, 3 pages.
Wikipedia, "Object-Oriented Programming," <http://web.archive.org/web/20051211141918/http://en.wikipedia.org/wiki/Object-oriented_programming>, Dec. 11, 2005, 10 pages.
Wikipedia, "OSI model," <http://web.archive.org/web/20050907132012/http://en.wikipedia.org/wiki/Osi_model>, Sep. 7, 2005, 8 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.

(56) References Cited

OTHER PUBLICATIONS

U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
3rd Generation Partnership Project 2, "Presence Service: Architecture and Functional Description", doc. No. 3GPP2 X.50027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 22, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/957,740, filed Dec. 1, 2010, Non-final Office Action mailed Aug. 15, 2013, 17 pages.
U.S. Appl. No. 12/957,697, filed Dec. 1, 2010 Non-Final Office Action mailed Oct. 1, 2013, 10 pages.
U.S. Appl. No. 12/019,335, filed Jan. 24, 2008, Final Office Action mailed Jan. 14, 2014, 33 pages.
U.S. Appl. No. 11/357,653, filed Feb. 16, 2006, Final Office Action dated Nov. 26, 2013, 25 pages.
U.S. Appl. No. 11/969,343, filed Jan. 4, 2008, Notice of Allowance mailed Jan. 16, 2014, 6 pages.
U.S. Appl. No. 12/018,718, filed Jan. 23, 2008, Advisory Action mailed Nov. 15, 2013, 3 pages.
U.S. Appl. No. 12/949,287, filed Nov. 18, 2010, Final Office Action mailed Nov. 25, 2013, 25 pages.
U.S. Appl. No. 11/357,653, Non-Final Office Action mailed on Mar. 27, 2014, 19 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Final Office Action mailed on Jul. 26, 2013, 19 pages.
U.S. Appl. No. 12/045,220, Final Office Action mailed on Apr. 18, 2014, 20 pages.
U.S. Appl. No. 12/544,484, Non-Final Office Action mailed on May 8, 2014, 13 pages.
U.S. Appl. No. 12/791,129, Advisory Action mailed on Mar. 6, 2014, 3 pages.
U.S. Appl. No. 12/791,129, Final Office Action mailed on Dec. 20, 2013, 9 pages.
U.S. Appl. No. 12/791,129, Notice of Allowance mailed on Apr. 24, 2014, 10 pages.
U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/949,287, Non-Final Office Action mailed on Nov. 19, 2012, 32 pages.
U.S. Appl. No. 12/957,697, Final Office Action mailed on Mar. 20, 2014, 12 pages.
U.S. Appl. No. 12/957,740, Final Office Action mailed on Feb. 19, 2014, 18 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.
U.S. Appl. No. 12/948,247, Non-Final Office Action mailed on May 21, 2014, 18 pages.
U.S. Appl. No. 13/029,226, Non-Final Office Action mailed on May 22, 2014, 12 pages.
U.S. Appl. No. 12/957,697, Advisory Action mailed on May 29, 2014, 2 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/957,697, Non-Final Office Action mailed on Jul. 2, 2014, 9 pages.
U.S. Appl. No. 12/957,740, Advisory Action mailed on May 23, 2014, 3 pages.
U.S. Appl. No. 11/357,653, Final Office Action mailed on Aug. 18, 2014, 15 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 2014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mialed on Sep. 8, 2014, 27 pages.
U.S. Appl. No. 12/948,247, Final Office Action mailed on Nov. 25, 2014, 20 pages.
U.S. Appl. No. 12/957,697, Final Office Action mailed on Nov. 26, 2014, 11 pages.

* cited by examiner

RESOURCE ABSTRACTION VIA ENABLER AND METADATA

CROSS-REFERENCES TO RELATED APPLICATIONS

The present application claims benefit under 35 USC 119 (e) of U.S. Provisional Application No. 61/305,293, filed on Feb. 17, 2010 by Maes and entitled "Resource Abstraction via Enabler and Metadata," and is a Continuation-in-part of U.S. patent application Ser. No. 12/490,540, filed Jun. 24, 2009 by Maes and entitled "Resource Abstraction via Enabler and Metadata," which claims the benefit of U.S. Provisional Application No. 61/075,823, filed Jun. 26, 2008 by Maes and entitled "Resource Abstraction Via Enabler and Metadata," all of which the entire disclosure of each is incorporated herein by reference for all purposes.

This application is also related to the following commonly-owned, applications (the "Related Applications"), of which the entire disclosure of each is incorporated herein by reference for all purposes:

U.S. patent application Ser. No. 10/855,999, filed May 28, 2004 by Maes and entitled "Method and Apparatus for Supporting Service Enablers Via Service Request Handholding"; U.S. patent application Ser. No. 11/130,636, filed May 16, 2005, by Maes and entitled "Methods and Systems for Exposing Access Network Capabilities Using an Enabler Proxy"; U.S. patent application Ser. No. 11/070,317, filed Mar. 1, 2005, by Maes and entitled "Policy Interface Description Framework"; U.S. patent application Ser. No. 11/357,653, filed Feb. 16, 2006, by Maes and entitled "Factorization of Concerns to Build a SDP (Service Delivery Platform)"; U.S. patent application Ser. No. 12/019,335, filed Jan. 24, 2008, by Maes and entitled "Integrating Operational and Business Support Systems with a Service Delivery Platform"; U.S. Provisional Patent Application No. 61/262,964, filed Nov. 20, 2009, by Maes and entitled "Methods and Systems for Generating Metadata Describing Dependencies for Composable Elements"; and U.S. patent application Ser. No. 12/490,540, filed Jun. 24, 2009, by Maes and entitled "Resource Abstraction via Enabler and Metadata."

This application is also related to commonly-owned U.S. Pat. No. 7,209,734, filed Jun. 30, 2004 by Maes and entitled "Virtual Mobile Service Provider", of which the entire disclosure is incorporated herein by reference for all purposes.

BRIEF SUMMARY OF THE INVENTION

Embodiments of the invention provide systems and methods for managing an enabler and dependencies of the enabler. According to one embodiment, a method of managing an enabler can comprise requesting a management function or interacting or receiving data or events via a management interface of the enabler. The management interface can provide an abstraction of one or more management functions for managing the enabler and/or dependencies of the enabler. For example, the management function can consist of a function for provisioning of the enabler, a function for activation of the enabler, a function for state monitoring of the enabler, a function for usage monitoring of the enabler, a function for health monitoring of the enabler, a function for updating of the enabler, a function for de-activation of the enabler, or another function. The metadata can be defined consistent with an interface definition for the management interface and may be stored in a metadata repository, for example, maintained by a supporting enabler.

In some cases, prior to requesting the management function metadata associated with the management interface can be read and a determination can be made as to whether the management function is available/sufficient or unavailable/insufficient. Requesting the management function via the management interface of the enabler can be performed in response to determining the management function is available. In response to determining the management function is unavailable or insufficient, one or more alternative functions can be identified based on the metadata and the one or more alternative functions can be requested. In some cases, prior to requesting the management function, a determination can be made based on the metadata as to whether an alternative function is available for one or more dependencies of the enabler. In response to determining an alternative function is available for at least one dependency, the alternative function can be requested.

Additionally or alternatively, in response to requesting the management function, an error can be received via the management interface indicating the management function cannot be performed by the enabler. In such cases, metadata associated with the enabler can be read and an alternative function can be selected based on the metadata. The alternative function can then be requested. For example, the alternative functions can consist of calls to a management interface of another enabler, calls to a functional interface of another enabler, a workflow, other processes, etc.

According to another embodiment, an enabler can comprise a management interface providing an abstraction of one or more management functions for managing the enabler or dependencies of the enabler. Metadata can be associated with the management interface. The metadata can be defined consistent with an interface definition for the management interface and can identify one or more alternative functions for at least one of the one or more functions. For example, the management function any one or more of a function for provisioning of the enabler, a function for activation of the enabler, a function for state monitoring of the enabler, a function for usage monitoring of the enabler, a function for health monitoring of the enabler, a function for updating of the enabler, a function for de-activation of the enabler, etc. The one or more alternative functions can be any one or more of calls to a management interface of another enabler, calls to a functional interface of another enabler, a workflow, etc. In some cases, the metadata may be stored in a metadata repository that can be maintained by a supporting enabler.

According to yet another embodiment, a system can comprise an enabler comprising a management interface providing an abstraction of one or more management function for managing the enabler and/or dependencies of the enabler. For example, the management function can consist of a function for provisioning of the enabler, a function for activation of the enabler, a function for state monitoring of the enabler, a function for usage monitoring of the enabler, a function for health monitoring of the enabler, a function for updating of the enabler, a function for de-activation of the enabler, or another function. Metadata can be associated with the management interface and through the enabler to do the same to the resources/dependencies. The metadata can be defined consistent with an interface definition for the management interface and can identify one or more alternative functions for at least one of the one or more functions. A requestor can be communicatively coupled with the enabler and can request a management function via the management interface of the enabler. The requestor can comprise a management process, a workflow, another enabler, another process, etc.

In some cases, the requestor can, prior to requesting the management function, read metadata associated with the management interface and determine whether the management function is available/sufficient or unavailable/insufficient. In such cases, requesting the management function via the management interface of the enabler can be performed in response to determining the management function is available or sufficient. Further, in response to determining the management function is unavailable or insufficient, the requestor may identify one or more alternative functions based on the metadata and request the one or more alternative functions. Even if the management function is available or sufficient, the requestor may, prior to requesting the management function, determine based on the metadata whether an alternative function is available or required for one or more dependencies of the enabler and, in response to determining an alternative function is available or sufficient for at least one dependency, request the alternative function.

Additionally or alternatively, in response to a request from the requestor, the enabler may generate an error in response to not being able to perform the management function. In such cases, the requestor can receive the error via the management interface indicating the management function cannot be performed by the enabler, read metadata associated with the enabler, select an alternative function based on the metadata, and request the alternative function. For example, the one or more alternative functions can comprise one or more of calls to a management interface of another enabler, calls to a functional interface of another enabler, a workflow, etc.

In some cases, the system may also include a metadata repository. In such cases, the metadata can be stored in the metadata repository. Additionally, the system may include a supporting enabler communicatively coupled with the enabler. The supporting enabler may provide access to the metadata repository.

DETAILED DESCRIPTION OF THE INVENTION

Figure 1:
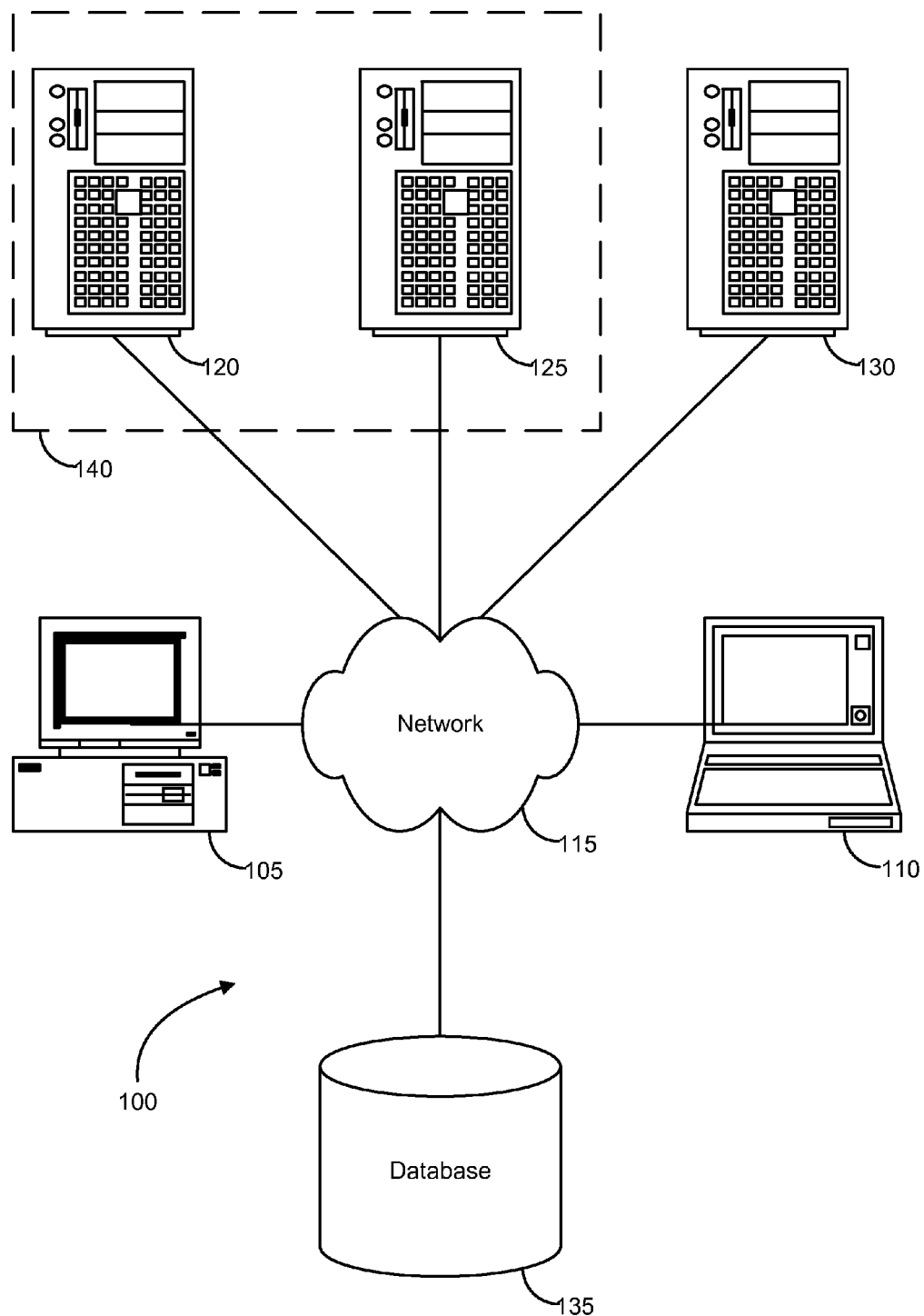
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for abstraction of a resource via an enabler and metadata. As described in the Related Applications cited above, an enabler can be defined as a reusable component that exposes capabilities from resources (e.g. other enablers, applications or services and network, OSS or BSS capabilities) via a functional interface. The exposure can be realized with an adapter architecture and layered architecture as described for example in the Related Application entitled "Factorization of Concerns to Build a SDP (Service Delivery Platform)" that allows the same component(s) to abstract different resources or composition of resources or technologies that provide a particular capability. The capabilities exposed in this way may be used to "use" or access the resource or capabilities of the resource.

An enabler may also be used to "manage" the resource. Embodiments of the present invention are directed to systematic ways to enable and automate such management. Generally speaking, management functions can be exposed by the enabler via a management interface of the enabler. Through this interface, the enabler and/or resources or dependencies of the enabler can be managed. Management functions exposed by the management interface of the enabler can include but are not limited to provisioning of the resource (i.e., configuration), activation of the resource, state monitoring of the resource (by querying or by registering/subscribing/listening), usage monitoring of the resource (by querying or by registering/subscribing/listening, health monitoring of the resource (by querying or by registering/subscribing/listening), updating of the resource, de-activation of the resource, and/or other functions. According to one embodiment, an enabler can comprise a software component. Additionally or alternatively, the enabler may itself be the result of composition by and/or from other enablers, e.g., other software components. Various embodiments can include cases where the enabler is itself the composition of enablers and adapters to resources where some of the enabler management operations are either not implemented as acting on the resources (e.g., because the resource requires an explicit action like push a button or because the enabler's adapters are not implementing the necessary actions to manage the resource) or composing enablers (e.g., because the composing enablers would not have been implemented in ways that also composes appropriately their management interfaces assuming that these have even been implemented) or these implementations are not in usage in a particular deployment (e.g. because they are behind a firewall, not allowed by policy to be performed by the management requester, etc).

According to one embodiment, metadata can be used to accommodate any gap in the enabler's abstraction of the resource capabilities for usage or management. That is, it is possible that the enabler is unable to manage some resources, for example, because the adapter of the enabler can't, the resource does not expose interfaces or ways to manage that resource, because policies prevent management, or because the resources are in different domains where they can't be managed for technical or governance reasons. It may therefore be impossible to completely manage the lifecycle of an enabler without also managing these resources separately. It is also possible that the enabler does not offer management interfaces to perform all the lifecycle management operation that are desired. Again this would require other ways to perform these operations. In such cases, additional information can be provided via metadata associated with the enabler and indicating how to manage the enabler and its dependencies. In other words, what the adapter, governance, or deployment allows to be managed via the enabler can be managed through the enabler's management interface and its adapter(s) to the resource(s). Management functions which are not permitted, available, exposed, etc. via the management interface can be captured in metadata associated with the enabler and indicating or identifying alternate ways to perform the management.

Additional details of various embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
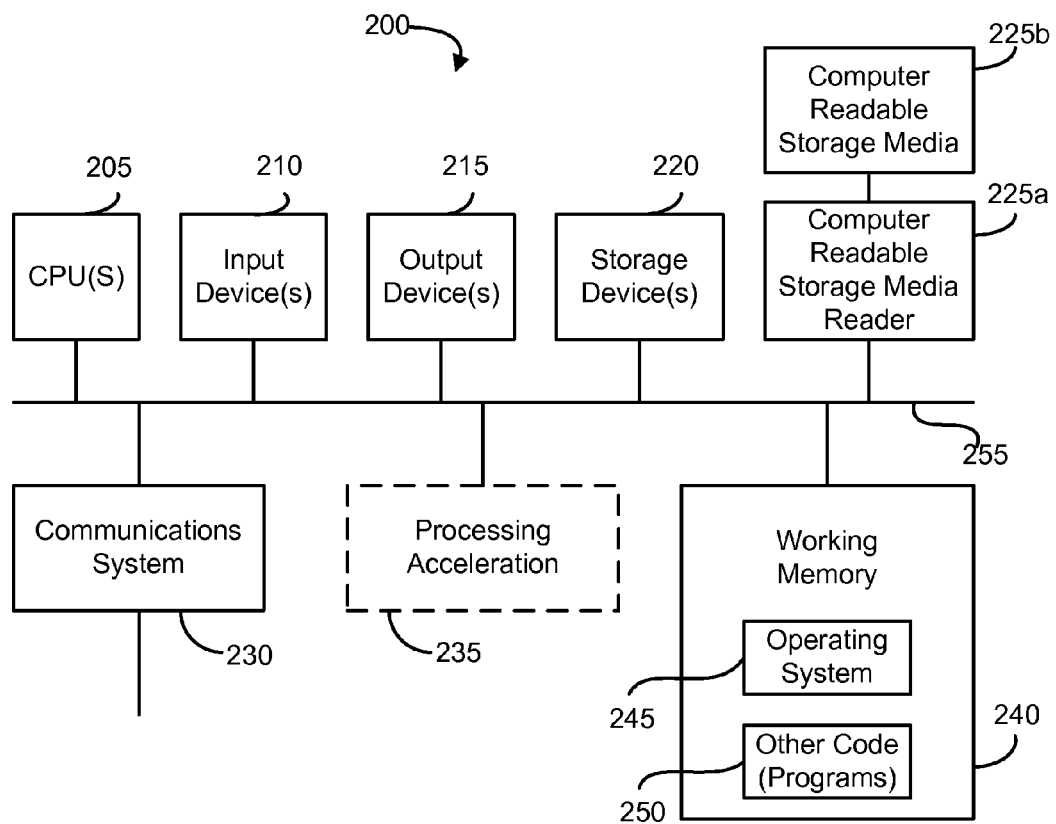
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
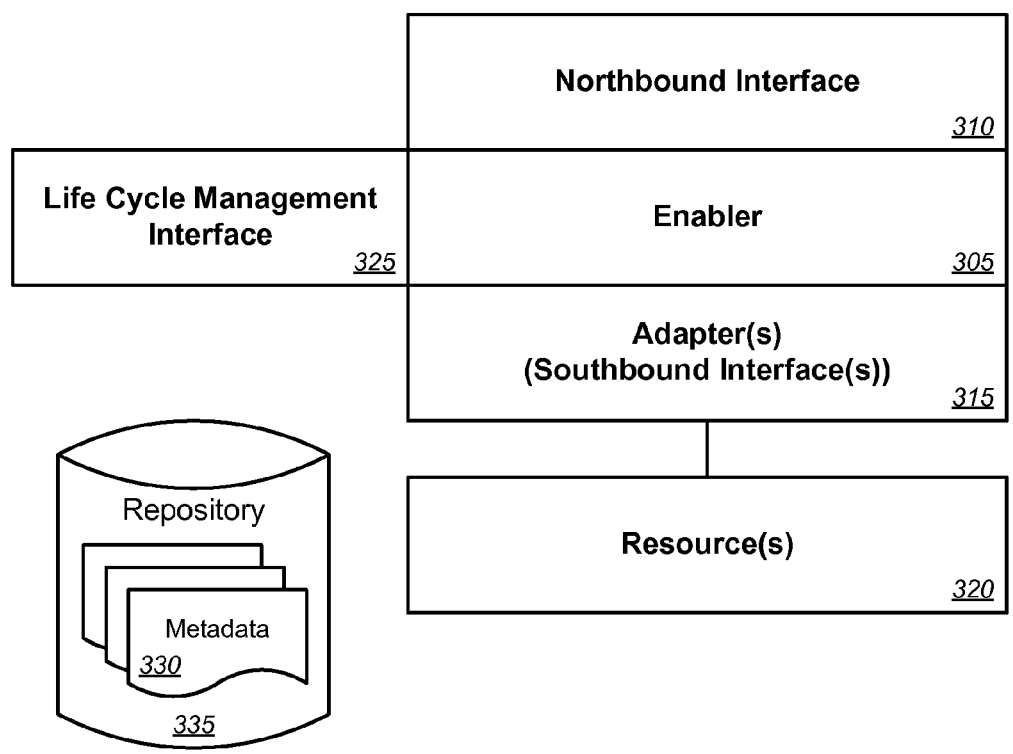
FIG. 3 is a block diagram illustrating functional components of an enabler according to one embodiment of the present invention.

FIG. 3 is a block diagram illustrating, at a high-level, functional components of an enabler according to one embodiment of the present invention. Details of various embodiments and uses of such an enabler are described in detail in the Related Applications cited above. For example, see the Related Application entitled "Factorization of Concerns to Build a SDP (Service Delivery Platform)". As used herein, the term enabler refers to a reusable service layer component or components that expose capabilities from resources (e.g. other enablers, applications or services and network, OSS or BSS capabilities) via a functional interface. The exposure can be realized with an adapter architecture and layered architecture as described for example in the Related Application entitled "Factorization of Concerns to Build a SDP (Service Delivery Platform)" that allows the same component(s) to abstract different resources or composition of resources or technologies that provide a particular capability. The capabilities exposed in this way may be used to "use" or access the resource or capabilities of the resource.

As described in the Related Applications, different resources, technologies, combination of resources, etc. can be used by an enabler using different adapters. In general, an enabler 305 provides abstract/logical functions and may rely on one or multiple resources 320, which in some cases may also be other enablers, to perform these functions via one or more adapters (south bound interfaces) 315 specific to the resource(s) 320. For example, the resource(s) 320 can comprise a service or a plurality of services or other elements, e.g., network resources, gateways, servers, clients, hardware, operating system or other software, etc. The enabler 305 also provides a northbound interface 310 to expose function(s) logically and/or abstractly and can be realized in any protocol/API/technology binding, e.g. Java, WS (SOAP or REST), SIP, C, C++, C#, etc. According to one embodiment of the present invention, the enabler 305 can also provide a management interface 325 to expose/provide management of the enabler 305 and its dependencies (i.e. resources 320 that the enabler implementation manages through the adapter 315). Management functions exposed by the management interface 325 of the enabler 305 can include but are not limited to provisioning of the enabler 305 (i.e., configuration), activation of the enabler 305, state monitoring of the enabler 305, usage monitoring of the enabler 305, health monitoring of the enabler 305, updating of the enabler 305, de-activation of the enabler 305, and/or other functions. Functions for monitoring various aspects of the enabler 305, e.g., state, usage health, etc., can be implemented, for example, by management interface(s) 325 for responding to queries from other components or on a registration/subscription and notification basis in which registered/subscribed and authorized listeners are informed/notified of changes in a state of the enabler 305 through a the management interface 325.

As noted, it is possible that the enabler 305 is unable to manage some resources 320 on which its lifecycle or execution depends, for example, because the adapter 315 of the enabler 305 can't, the resource 320 does not expose interfaces or ways to manage that resource 320, because policies prevent management, or because the resources 320 are in different domains where they can't be managed for technical or governance reasons. It may therefore be impossible to completely manage the lifecycle of the enabler 305 without also managing these resources 320 separately. It is also possible that the enabler 305 does not offer management interfaces 325 to perform all the lifecycle management operation that are desired. Again this would require other ways to perform these operations. In such cases, additional information can be provided via metadata 330 associated with the enabler 305 and indicating how to manage the enabler 305 and its dependencies. In other words, management functions which are not permitted, available, exposed, etc. via the management interface 325 can be captured in metadata 330 associated with the enabler 305 and indicating or identifying alternate ways to performed the management function. Therefore, what the adapter 315, governance, or deployment allows to be managed via the enabler 305 can be managed through the enabler's management interface 325 and its adapter(s) 315 to the resource(s) 320 and metadata 330 can be used to accommodate any gap in the enabler's 305 abstraction of the resource 320 capabilities for usage or management.

According to one embodiment, the metadata 330 can be stored in one or more metadata repositories 335 that are associated with the enabler 305. Associating the metadata 330 with the management interface 325 can comprise compiling the metadata 330 and storing it in a repository 335 wherein it can be associated at registration, discovery, or retrieval with the management interface of the enabler 305 or enabler instance. The metadata 330 can be associated and maintained consistently with the management interface description and how it is stored or made available. This means that the metadata 330 can correctly represent changes of dependencies throughout the state of the enabler 305 and its instances, i.e., the association may be to an enabler 305 or an enabler instance (a structure of the enabler in a data model). It should be understood that other implementations that realize these concepts are contemplated and arte considered to be within the scope of the present invention. For example, these functions can be done also by adding pointers in metadata to a management interface or to an enabler or conversely in an interface (functional or management) to the metadata. Additionally or alternatively, the metadata could be embedded in the enabler interface description. Additionally or alternatively, the repositories for interface description and the metadata (as well as other metadata about the enabler (functional) or its business usage (e.g. product/service catalog) can be combined to contain all or some subset less than all of this information or separated in different entities.

Requesters of the management functions of the enabler 305 or policy enforcers can be then informed of the metadata 330 associated with the enabler 305 or management interfaces 325 as described in the Related Applications cited above. For example, see the Related Applications entitled "Policy Interface Description Framework", "Method and Apparatus for Supporting Service Enablers Via Service Request Handholding", "Methods and Systems for Exposing Access network Capabilities Using an enabler Proxy", and "Factorization of Concerns to Build a SDP (Service Delivery Platform)". It should be understood that, while illustrated here as separate from the enabler 305, the metadata 330 and/or repository 335, if any, need not be separate from the enabler 305. Rather, in some cases, the metadata 330 may be maintained/stored by the enabler 305. In other cases, the metadata 330 and/or repository 335 may be separate and accessible by/with another enabler (not shown here). Various other implementations are contemplated and considered to be within the scope of the present invention. Regardless of exactly how or where it is maintained, the metadata 330 can, according to one embodiment, document missing capabilities of the management interface 325, document a recipe of what needs to be done to affect those functions, and optionally provide details or recipe (e.g. composition/BPEL) of other enablers/services/interfaces that can be used instead to affect the particular management function.

Therefore, if a resource 320 is to be managed, it can be exposed through an enabler 305 as explained above and in the Related Applications. The same is true for services that are the result of composition of other services. So for example, a Web 2.0 marketplace of services can be managed even if the services are provided by different service providers. Metadata 330 can also be combined with the intangible dependencies described in the Related Application entitled "Metadata Describing Dependencies for Composable Elements." Metadata 330 or management interfaces 325 may also describe and/or support extensible attribute sets and schemas for the management interfaces 325.

When the enabler 305 or a resource 320 is to be managed, a requesting service, application, etc. can access and read the metadata 330 associated with that enabler 305 and determine how to perform the desired management function. For example, the requestor, upon reading the metadata 330 may determine that a particular management function is not available through the management interface 325 of the enabler 305. However, the metadata 330 may indicate one or more alternative functions, workflows, processes, other enablers, etc. for performing the unavailable function(s). Therefore, the requestor may then decide to implement or perform the management function according to the indications of the metadata 330. Additionally or alternatively, the requestor can request a desired management function and, if the requested management function is not available through the management interface 325 of the enabler 305, the enabler 305 can return an error message, i.e., a "no-op" message, to the requestor indicating the unavailability of the requested function. According to one embodiment, the error message may include or indicate the metadata 330 associated with the management interface 325 and requested function. The requestor, upon receiving such an error message may then implement or perform the management function according to the indications of the metadata 330.

Stated another way, an enabler 305 can comprise a management interface 325 providing an abstraction of one or more management functions for managing the enabler 305 or dependencies of the enabler 305 such as resources 320, for example. Metadata 330 can be associated with the management interface 325. The metadata 330 can be defined consistent with an interface definition for the management interface 325 and can identify one or more alternative functions for at least one of the one or more functions. For example, the management function can comprise any one or more of a function for provisioning of the enabler or resource 305, a function for activation of the enabler or resource 305, a function for state monitoring of the enabler or resource 305, a function for usage monitoring of the enabler or resource 305, a function for health monitoring of the enabler or resource 305, a function for updating of the enabler or resource 305, a function for de-activation of the enabler or resource 305, etc. The one or more alternative functions can be any one or more of calls to a management interface 325 of another enabler, calls to a functional interface, i.e., northbound interface, of another enabler, a workflow, etc. In some cases, the metadata 330 may be stored in a metadata repository 335 that can be maintained by a supporting enabler as will be described in greater detail below.

Managing such an enabler 305 and/or dependencies of the enabler 305, e.g., resources 320, can be performed by a requestor, i.e., an application, another enabler, a workflow, etc., requesting a management function via a management interface 325 of the enabler 305. For example, prior to requesting the management function, the requestor may read the metadata 330 associated with the management interface 325 and make a determination as to how to perform or request the management function. For example, the requestor can determine whether the management function is available or unavailable. Requesting the management function via the management interface 325 of the enabler 305 can be performed in response to determining the management function is available or sufficient. In response to determining the management function is unavailable or insufficient, one or more alternative functions can be identified by the requestor based on the metadata 330 and the one or more alternative functions can be requested. Additionally or alternatively, the requestor can make a determination based on the metadata 330 as to whether an alternative function is available or sufficient for one or more dependencies of the enabler 305. In response to determining an alternative function is available or sufficient for at least one dependency the requestor can request the alternative function as indicated by the metadata 330.

In another exemplary use, the requestor may make a request to the enabler 305 before or without checking the metadata 330. In such cases, the enabler 305 may generate and return a "no-op" or other error message if the request is for a function or dependency of the enabler 305 that is not support. Therefore, in response to requesting the management function, the requestor may receive an error via the management interface 325 indicating the management function cannot be performed by the enabler. In such cases, metadata 330 associated with the enabler 305 can be read by the requestor and an alternative function can be selected and requested by the requestor based on the metadata 330.

Figure 4:
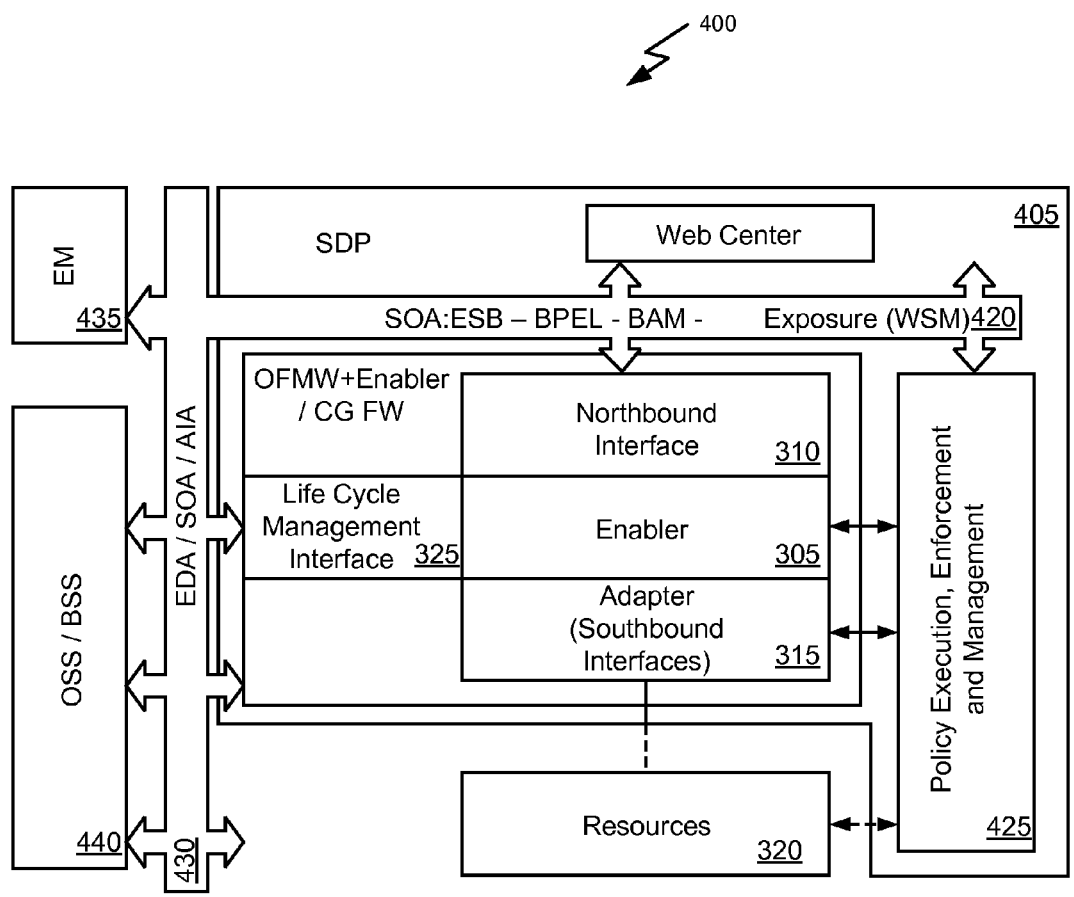
FIG. 4 is a block diagram illustrating a system including an enabler according to one embodiment of the present invention.

FIG. 4 is a block diagram illustrating a system including an enabler according to one embodiment of the present invention. In this example, the system 400 includes an enabler 305 as introduced above. The enabler 305 can include a northbound interface 310 that abstracts one or more functions of resources 320 as described above and provide access to the abstracted one or more functions. The enabler 305 can also include one or more adapters 315 or southbound interfaces. The adapters 315 can, for example, communicate in the protocol supported by the resources 320, e.g., SIP, HTTP, Diameter, or other Intelligent Networking (IN) protocol including but not limited to Transaction Capabilities Application Part (TCAP), Internet Message Access Protocol (IMAP), Customized Applications for Mobile Enhanced Logic (CAMEL), etc.

As noted in the Related Applications, the enabler 305 can abstract or hide the underlying technologies of the resources 350. That is, the enabler 305 can communicate and/or interact with the resources 320 in a protocol appropriate to those resources 320 via the adapters 315 or southbound interfaces and provide access to those resources 320 in a manner abstracted from the underlying protocols or technologies of those resources 320 via the northbound interface 310. Actions of the enabler 305 and/or resources can also be controlled or affected by a management interface 325 to affect one or more management functions and/or one or more policies applied by policy execution, enforcement, and management module 435.

According to one embodiment, the enabler 300 can be implemented as part of a Service Delivery Platform (SDP) 505 such as described, for example, in the Related Application entitled "Factorization of Concerns to Build a SDP (Service Delivery Platform)" referenced above. As noted therein, the SDP 505 can include an Enterprise Service Bus (ESB) 420. In such cases, the enabler 305 can be adapted to communicate with or through the ESB 420 via the northbound interfaces 305 of the enabler 300. That is, the enabler 305 can be adapted to place abstracted notifications or other information from the resources 320 and/or enabler 305 or events thereof on the ESB 420 via the northbound interface 310 and/or the management interface 325. Additionally or alternatively, the northbound interface 305 and/or management interface 325 of the enabler 305 can receive instructions and/or other information from other elements of the system 400 from the ESB 420.

For example, ESB 420 coupled with/implemented as part of Event Driven Architecture (EDA) 430 as described, for example, in U.S. patent application Ser. No. 12/045,220 filed Mar. 10, 2008 by Maes and entitled "Presence-Based Event Driven Architecture" the entire disclosure of which is incorporated herein by reference for all purposes. As noted therein the EDA 430 can also include or be coupled with an event monitor 435 and/or other application as well as 686 and Operation Support Systems/Business Support Systems (OSS/BSS) 440. In use, events or information from the resources 320 can come in from the adapters 335 and be placed on the bus/ESB 420 by the northbound interface 305 of the enabler 300. Additionally or alternatively, events or information from the resources 320 and/or from the logic of the enabler 305 can be placed on the bus/ESB 420 by the management interface 325 of the enabler 305. The events can then be distributed to a target listener (e.g., the event monitor 435 or other registered application(s) if any). In between the events may be managed, for example based on policies enforced by policy execution, enforcement, and management module 425 to order the events with a strategy, e.g., a concurrency strategy, that decides when multiple events are to be processed, who and when they are put on the bus 420, how the bus 420 processes them and how the listeners process them etc.

Figure 5:
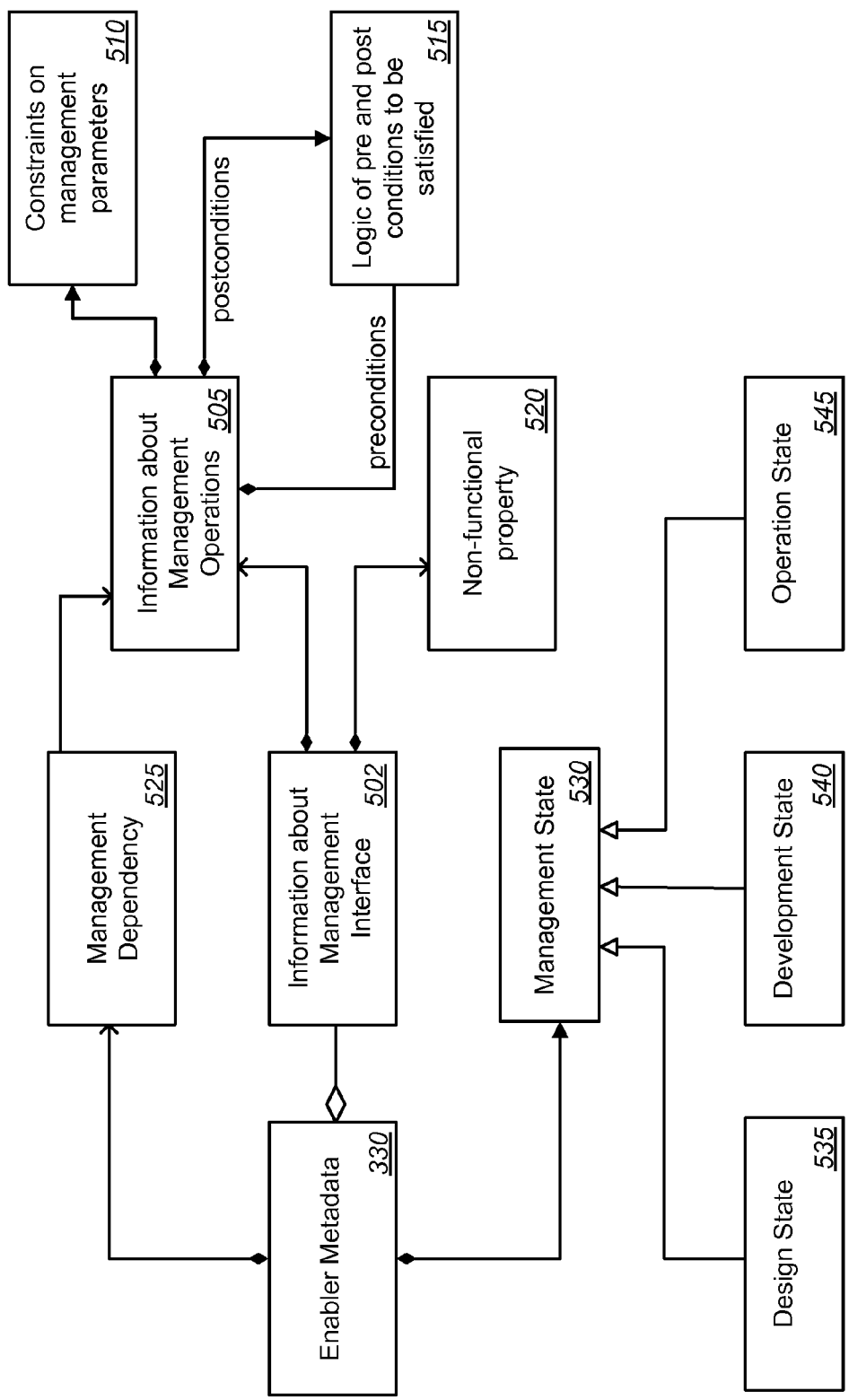
FIG. 5 is a block diagram illustrating an exemplary logical structure for metadata according to one embodiment of the present invention.

In summary, embodiments of the present invention provide an enabler 305 that can be resource and/or technology independent with adapters 315, wherein the adapters 315 and resources 320 support particular functions. Enabler adapters 315 can also be built to abstract resource 320 details for use in the service layer (i.e. instead of using resources 320 and/or adapters 315 to have an enabler 305 function supported, an enabler 305 can be used to expose enabler functions). The enabler 305 can be used to abstract resources 320 for management (instead of just capabilities) via the management interface 325 and metadata associated with the enabler 305 for management functions that may be unavailable or insufficient through the enabler 305 for any of a variety of reasons noted above. According to one embodiment, if a requested capability or management function can not be provided through or by the enabler 305, it can be reacted to as an error by enabler 320. The error can include a pointer to the metadata (place holder in specs). The metadata can be maintained consistent with or associated/coordinated with the definition of the management interface 325 of the enabler 305. Thus, it can be changed if the resource 320 changes. The metadata can also represent composed resources/services and thus can change if the composition changes. The requestor, upon receiving such an error message, may then implement or perform the management function according to the indications of the metadata According to another embodiment, a requester of the function of the enabler 305, such as an event monitor 435 or another application, can find the metadata in the overall system, for example, at system setup, via an out-of-band message or communication, by association with the interface or in the interface. As noted above, the metadata can provide alternate interfaces/ways/recipes to execute the functions, access the requested capability, or perform the management functions requested. For example, the enabler 305 can provide an alternative interface to manage the resource 320 or initiate a workflow (e.g. including possible steps of provisioning, replacing pieces, configuring, etc.) Interfaces then may describe with metadata also how to manage a system through the generic interface (e.g., describe a schema of information to pass or where to get that description etc.) when it can't be described with a logic function (e.g. function with extensible/discoverable attribute set). Therefore, the requestor may then decide to implement or perform the management function according to the indications of the metadata FIG. 5 is a block diagram illustrating an exemplary logical structure for metadata according to one embodiment of the present invention. In this example, the metadata 330 associated with an enabler can consist of additional information 502 about the management interface of the enabler like functional properties 505 of the management interfaces (i.e. rather than the properties of the functional/northbound interface). These functional properties 505 of the management interface can include constraints 510 on parameters of the management operations exposed through the management interfaces and/or pre and post conditions 515 related to management operations exposed through the management interfaces of the enabler. The additional information 502 about the management interface of the enabler can also include non-functional properties 520 of the management interfaces. These non-functional properties 520 of the management interfaces can include additional context information which would influence the usage of the management interfaces (e.g. time to execute, annotation of the enabler such as class of service it is usable for with particular settings, security control, etc.

The metadata 330 can also include or indicate management dependencies 525 of the enabler. The management dependencies 525 can comprise, for example, information capturing a logical flow of alternate and/or additional management operations (using other enablers (via their northbound interfaces) or using other management interfaces of other enablers) with their associated functional properties related to the enablers and the resources which should be managed consistently. The metadata 330 can also include management state 530 information for the enabler. The management state 530 information can comprise design state 535 if in a design phase, deployment state 540 if in a deployment phase, operation state 545 if in operation phase, etc. The metadata can be "associated with" the management interface description of the enabler. That association may (but does not need) be captured in the metadata.

Figure 6:
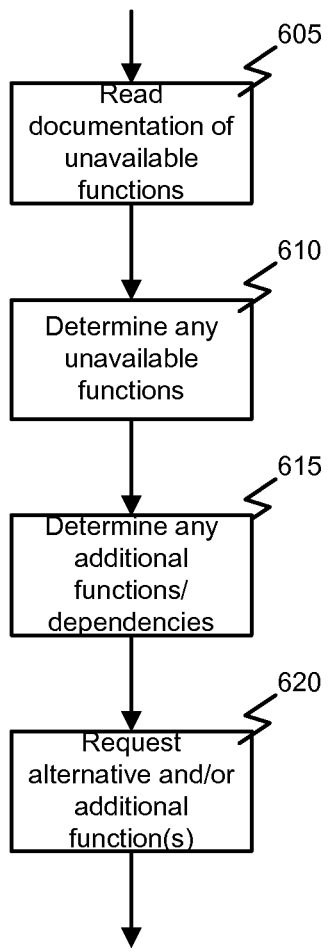
FIG. 6 is a flowchart illustrating a process for managing an enabler and/or its dependencies according to one embodiment of the present invention.

FIG. 6 is a flowchart illustrating a process for managing an enabler and/or its dependencies according to one embodiment of the present invention. As noted above, managing an enabler and/or dependencies of the enabler as described herein can be performed by a requestor, i.e., an application, another enabler, a workflow, etc., requesting a management function via a management interface of the enabler. More specifically and as illustrated in this example, the requestor may read 605 the metadata associated with the management interface and make a determination as to how to perform or request the management function. For example, the requestor can determine 610 whether the management function is available/sufficient or unavailable/insufficient. A further determination 615 may be made based on the metadata as to whether an alternative function is available or sufficient for one or more dependencies of the enabler related to the request. The requestor can request 620 the additional and/or alternative function(s) as indicated by the metadata.

Figure 7:
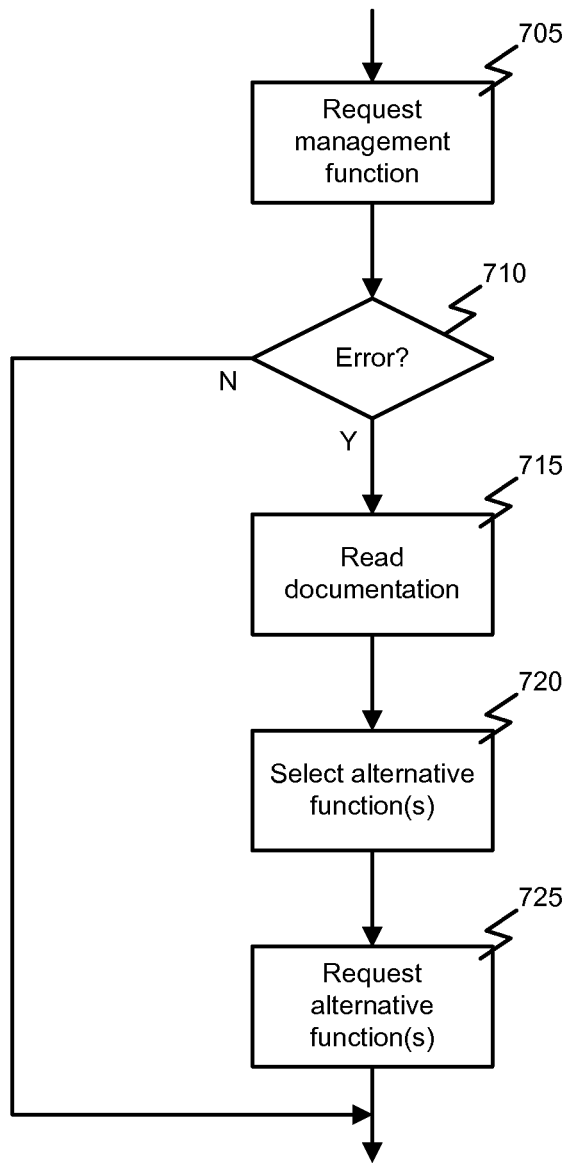
FIG. 7 is a flowchart illustrating a process for managing an enabler and/or its dependencies according to an alternative embodiment of the present invention.

FIG. 7 is a flowchart illustrating a process for managing an enabler and/or its dependencies according to an alternative embodiment of the present invention. As noted above, in another exemplary use, the requestor may make a request 705 to the enabler before or without checking the metadata. In such cases, the enabler may generate and return a "no-op" or other error message if the request is for a function or dependency of the enabler that is not support. The requestor may then determine 710 whether such an error is returned. If 710 an error message is received by the requestor, metadata associated with the enabler can be read 715 by the requestor and an alternative function can be selected 720 and requested 725 by the requestor based on the metadata.

As introduced above, a requestor of management functions of an enabler can comprise any service, application, workflow, another enabler, etc. Similarly, dependencies of an enabler can comprise any number of services, applications, components, other enablers, etc. Thus, it is contemplated that multiple enablers providing different management functions based on embodiments of the present invention can be employed to implement an infrastructure. An exemplary infrastructure implemented in such a manner is described with reference to FIG. 8.

Figure 8:
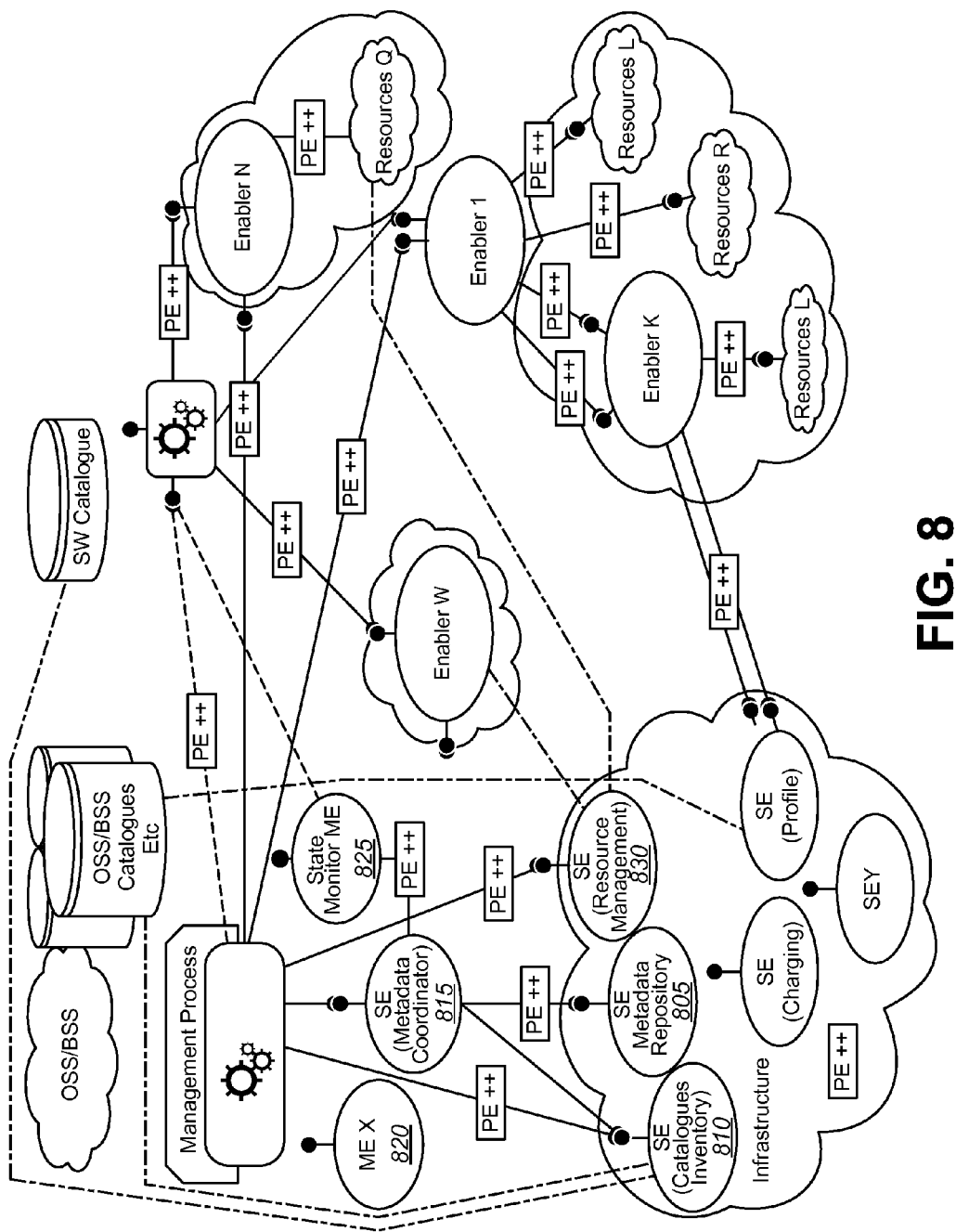
FIG. 8 is a block diagram illustrating an exemplary infrastructure implemented according to one embodiment of the present invention.

FIG. 8 is a block diagram illustrating an exemplary infrastructure implemented using embodiments of the present invention. This figure uses the following terms and abbreviations: policy enforcer (PE); managing enabler (ME); and supporting enabler (SE) which will be described below. Generally speaking, the figure shows an environment 800 implemented with and according to embodiments of the present invention. It should be noted that elements illustrated here and the functions performed thereby can be implemented internally or as separate components/systems.

The enabler management repository SE 805 is an SE that can hold the interface description of the management interface of enablers and their instances. In addition to the management interface descriptions, the enabler definition may include the description of the enabler's functional behaviour, as well as functional interface descriptions but these latter two aspects are not mandated and can reuse common UDDI models/techniques. In either case, the enabler management repository SE 805 provides a functional interface through which enablers' management interface descriptions can be stored, accessed, and manipulated.

The enabler lifecycle metadata repository SE 810 is an SE that holds the enabler lifecycle metadata for various phases of the enabler lifecycle. The enabler lifecycle metadata repository SE 810 can provide a functional interface through which the enabler lifecycle management metadata can be stored, accessed, and manipulated.

The enabler metadata coordinator SE 815 can provide the front-end to access or manage information in the enabler management repository SE 805 and enabler service lifecycle metadata repository SE 810. The enabler metadata coordinator SE 815 can act as a proxy to any management interaction of other entities (e.g. ME and other management processes/requesters) to the enabler management repository SE 805 or enabler lifecycle management metadata repository SE 810 so that appropriate association can be maintained between the enabler lifecycle management metadata and the management interface of the enabler to which it is associated.

One or more management enablers (MEs) 820 can be provided including but not limited to a provisioning management enabler, a quality/problem management enabler, a usage monitor enabler, a state monitor enabler, and/or others. A provisioning management enabler can support the fulfillment processes for enablers. For this function, it may rely on traditional resource management support systems and/or on the resource activation enabler described below. A quality/problem management enabler can support assurance processes for enablers. For this function, it may rely on traditional resource management support systems and/or on the resource and state monitor enablers described below. An enabler usage monitor can allow monitoring of the usage of enablers by querying or subscribing to usage information through the enabler management interface. It can support, for example, billing processes for enablers. For this function, it may rely on traditional billing support systems and/or on the usage monitor enabler described herein. A state monitor enabler can be an SE that monitors state or dependency updates of an enabler and uses the service lifecycle metadata coordinator enabler SE 815 to update this information in the enabler lifecycle metadata repository SE 810. The state of an enabler can be modeled as: un-configured, i.e., an enabler without a set attributes (e.g., newly created or retired enablers); configured, i.e., an enabler with a set of attributes including associated to metadata (e.g., updates, versions, etc.); activated, i.e., the enabler is available for a particular context; instantiated, i.e., the enabler is in use; rogue, i.e., there are problems when using an instantiated enabler; and/or de-activated, i.e., the enabler is unavailable in a particular context.

One or more resource management SEs 830 can be provided including but not limited to a resource activation enabler SE, resource monitor enabler SE, and/or a usage monitor enabler SE. A resource activation enabler SE can abstract the activation and/or configuration of resources. It can provide a functional interface through which a request to activate and/or configure a resource can be made and responses received. A service resource activation/configuration enabler SE can be provided to model activation or configuration of resources or services or enablers that can not be managed through the management interfaces of an enabler (e.g. because of policies, resource limitations or distribution across domains, implementation of the enabler as described above). The implementation of the resource activation/configuration enabler SE can be done case by case (e.g. via other adapters and workflows that abstract the steps to actually perform the task for the resources that are to be managed). A resource monitor enabler SE can abstract the monitoring of resources. It can provide a functional interface through which a request to monitor a resource can be made and responses received. The resource monitoring enabler SE can model monitoring (listening or querying health, usage or state) of resources or services that can not be managed through management interface of an enablers (e.g. because of policies, resource limitations or distribution across domains, implementation of the domain as described above). A usage monitor enabler SE can be a particular SE that allows monitoring of the usage of resources or enablers by querying or subscribing to usage information for the enabler.

The various enablers described here can expose various interfaces abstracting the functions performed by the enabler. For example, the various enablers can provide an enabler management interface as introduced above that can logically expose operations including but not limited to:

Provisioning of an Enabler: Setting up the settings of an enabler.

Activation of an enabler: Making the enabler available for a particular context.

State monitoring of an enabler: Querying the history and current status in terms of life cycle management (for specific instances of the enabler) and/or listening for status updates.

Usage monitoring of an enabler: Querying for usage metrics from the enabler or listening for usage metrics reports or alarm (e.g. if metrics conditions imply notifications).

Health and usage monitoring of an enabler: Querying for health metrics from the enabler or listening to alarm from the enabler.

Update of an enabler: Modification of the setting or life cycle management status of an enabler.

De-activation of an enabler: Making the enabler unavailable in a particular context and possibly de-associating metadata—although this may not be exposed by the management interface but may be performed on metadata repository SE through metadata coordinator SE.

Additionally, the MEs and SEs described with reference to FIG. 8 can provide one or more functional interfaces. For example, a functional interface of the enabler management repository SE 805 can logically exposes the following operations: Add Enabler; Modify Enabler; Delete Enabler; List Enablers; Get details on Enabler; Find Enabler; etc. In another example, a functional interface of an enabler lifecycle metadata repository SE can logically exposes operations such as get, set, modify, create, delete, list, etc. on identified metadata structure elements. In yet another example, a functional interface of the enabler lifecycle metadata coordinator SE 815 can logically expose operations including but not limited to:

Extend metadata for enabler x

Modify metadata value for enabler x

Check metadata value of data element d of enabler x

Get information on the support entity for management operation y on enabler x

Modify information on the support entity for management operation y on enabler x Etc.

It should be understood that details of embodiments of the present invention can vary between implementations without departing from the scope of the present invention. For example, embodiments of the present invention can be implemented with Web Services Description language (WSDL), Universal Description Discovery and Integration (UDDI), service catalogs, etc. Furthermore, the generic interfaces of the enablers can be used to manage any resource or service. Various systems can be implemented to enforce/coordinate the embodiments of the invention and/or use the interface to manage any resource of service. The enablers can expose to applications and/or $3^{rd}$ parties the resource or service capabilities (possibly with policy enforcement). In some cases, enablers can do out-of-band management of resources or provide alternatives to missing capabilities/functions. Various other alternatives and variations are contemplated and considered to be within the scope of the present invention.

While exact implementations can vary, an exemplary embodiment of metadata will be described for illustrative purposes. This example is based on life cycle management metadata as discussed above and which comprises additional information about management interface of enablers, management dependencies of enablers, and management state of the enablers. This example is focused on how to address the problem of management dependencies of a enablers. Management dependencies of an enabler can be considered amounts for associating a recipe on how to manage dependencies with management interface operations and attributes. A recipe can be a program (e.g. script) that performs the additional management instructions. Per the philosophy so far of the pattern to manage enablers and dependencies that we described above, the recipe can be "readable" by the management requester so that it can either execute it or use the information to decide itself what to do and can be machine readable, human readable, or something facilitated with a declarative approach. Typically, the recipe can involve calling (management) interfaces of other enablers and/or calling Functional Interfaces (FIs) of other supporting enablers (to manage resources without management interfaces or deal with other limitations, e.g., cross domain policies etc.) These may involve "human workflows".

Such recipes match the concept of a "business process." For example, reusing existing standards and industry practices, the recipe can be modeled by Business Process Management (BPM). A possible standard to reuse is Business Process Execution Language (BPEL). This can be illustrated by the following use case:

When intending to perform a management interface operation with specific attribute to a enabler instance, a management requester retrieves the life cycle metadata associated to the management interface operation and attributes for that instance (e.g. from the lifecycle management supporting enabler described above)

It obtains a business process (e.g. BPEL) that it can inspect

Managing the enabler can be done by calling the enabler's management interface (call to management interface operation with intended attributes) and executing the business process (e.g. BPEL that orchestrates calls to other management interfaces and supporting enablers— BPEL can also include human processes where human operator are notified, perform requested operations, and confer the result via messages that let the process further execute).

In various implementations, recipes can be associated to instances, operations, and/or attributes. To do so, one could push the problem to the lifecycle management supporting enablers interface/behavior or split the problem as follows:

Let the lifecycle management enabler interface map to the right management metadata associated to a give instance (via instance identification and the "metadata coordinator supporting enabler")

And define a (declarative) convention that maps recipes to management interface operation and attributes. This can be achieved, for example, via a scripting language with conditions on "operations" and "attribute values."

This can again be realized via business process (e.g. BPEL) where operations (verbs) are treated as extra attributes. Illustrating via an exemplary use case:

The metadata coordinator supporting enabler has ensured appropriate management metadata instance is stored in the Lifecycle management supporting enabler The requester just retrieves the management metadata associated to an enabler (instance), as a business process.

Inspecting or better yet executing the business process (e.g., BPEL) ensures that recipes can be "adapted" to the operation performed with conditions on verb (e.g., a BPEL attribute) and attribute values.

In another implementation, one could also use instance identifiers the same way. However, such an implementation would probably result in changes and a very large business process definition.

Another exemplary use case illustrates manage of an enabler with dependencies that it can't manage itself. In this example, the business process can orchestrate calls to appropriate SES SMIs and ISS FIs, e.g., the BPEL executes preconditions, calls enabler management interface operation with appropriate attributes, then orchestrates calls to other enablers' management interfaces and supporting enablers. If, for example, a human intervention (e.g. to reset a resource or initiate an operation in a firewalled domain) is needed, it can be performed by an orchestrated supporting enabler call or even modeled in BPEL. Different approaches are therefore:

Specification of a declarative convention to pass operation and attribute;

Specified use of a BPM standard (e.g. BPEL) for the recipes; and/or

Specification of a convention for mapping business process to SES instance, suitable with a repository ISS.

Going beyond this to support full metadata as discussed in this invention. Management metadata aspects are discussed above. Based on this description, additional information about an enabler can be included declaratively in the business process (e.g., as BPEL comments). Convention could be specified or ignored. Things like pre or post conditions to SMI can also be model-able as part of the business process associated to certain SMI operations or as additional business processes Another exemplary use case illustrates management of an enabler with dependencies that it can't manage itself. In this example, the business process can orchestrate calls to appropriate SES SMIs and ISS FIs, e.g., the BPEL executes preconditions, calls SES SMI operation with needed attributes, then orchestrates necessary calls to other SES SMIs and ISSs. If, for example, a human intervention (e.g., to reset a resource or initiate an operation in a firewalled domain) is needed, it can be performed by an orchestrated ISS call or even modeled in BPEL.

Note that it is also possible to have a case where the metadata is a schema and data driven. However, a business process can contain such information and can encompass much more. Additionally, a data structure would involve pushing much enabler specific knowledge to the requester/manager. Accessing the management metadata for an enabler would not help determine what to do next without that knowledge. A recipe forces the design and deployment stage to capture not just the information but hints on how to actually automatically exploit. During operation again maintaining the recipe is straightforward and involves concretizing the interface instances to point to in the recipe for an enabler instance. Implementing the recipe as XML/human readable allows approaches that would decide themselves on the management requester side what to do and therefore supports anything that the data schema only approach would support. The recipe approach limits the semantic to specify while being able to support any use case. The data schema only approach, because it contains no recipe, would rely on specification of a semantic to allow a requester to infer a recipe. That is a tremendous task and risks being enabler specific. Even in such cases, the management requester still would need to know much about the enabler specific meanings which is huge task that is not finite, 2) recipe for no adoption at least cross industry, assuming the size of the task is overcome, and 3) is not needed because with a recipe approach the problems are avoided. With BPEL even if the recipe specification exists, the trigger and passage of operation can be specified and attributes and may be a metadata skeleton structure for the BPEL document.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for managing a plurality of enablers, the method comprising:

executing an application by a computer system;

executing the plurality of enablers by the computer system including a first enabler and a second enabler, wherein each enabler comprising:

a northbound interface providing an abstract, network agnostic interface providing notification of network events and for invoking one or more of a plurality of functions of a network resource, wherein the enabler is between the application and the network resource and wherein the application interacts with the network resource through the enabler, a southbound interface providing an interface specific to the network resource regardless of a network or protocol of the northbound interface, and a management interface comprising a business process definition providing an abstraction of a plurality of management functions for managing a lifecycle of the enabler and dependencies of the enabler;

receiving, by the application, a request from the first enabler via the management interface of the first enabler, the request comprising a request to perform management functions for managing the second enabler;

reading, by the application, metadata associated with the management interface of the second enabler, said metadata indicating a plurality of management functions that are available through the management interface of the second enabler, said metadata also indicating a plurality of management functions that are unavailable through the management interface of the second enabler, and said metadata also indicating alternative ways to perform the unavailable management functions, the plurality of management functions comprising at least a function for provisioning of the enablers;

determining, by the application, the management functions of the second enabler that are available or unavailable based on the metadata;

in response to determining the requested management function is available, requesting, by the application, the requested management function via the management interface of the second enabler; and in response to determining the requested management function is unavailable, identifying, by the application, one or more alternative functions based on the metadata indicating alternative ways to perform the unavailable requested management function and requesting the one or more alternative functions; and providing, by the application, the available management functions and the alternative functions of the second enabler to the first enabler for management.

2. The method of claim 1, wherein one of the requested management functions of the plurality of enablers comprises the function for provisioning of one or more enablers and the plurality of management functions further comprise one or more of a function for activation of the one or more enablers, a function for state monitoring of the one or more enablers, a function for usage monitoring of the one or more enablers, a function for health monitoring of the one or more enablers, a function for updating of the one or more enablers, or a function for de-activation of the one or more enablers.

3. The method of claim 1, wherein the metadata is defined consistent with an interface definition for the management interface and identifies one or more alternative functions for the requested management function.

4. The method of claim 3, wherein the one or more alternative functions are selected from a group consisting of calls to a management interface of another enabler, calls to a functional interface of another enabler, and a workflow.

5. The method of claim 1, wherein the metadata is stored in a metadata repository maintained by a supporting enabler.

6. A system comprising:

a processor; and a memory communicatively coupled with and readable by the processor and having stored therein a series of instructions which, when executed by the processor, cause the processor to manage a plurality of enablers by:

executing an application by a computer system;

executing the plurality of enablers by the computer system including a first enabler and a second enabler, wherein each enabler comprising:

a northbound interface providing an abstract, network agnostic interface providing notification of network events and for invoking one or more of a plurality of functions of a network resource, wherein the enabler is between the application and the network resource and wherein the application interacts with the network resource through the enabler, a southbound interface providing an interface specific to the network resource regardless of a network or protocol of the northbound interface, and a management interface comprising a business process definition providing an abstraction of a plurality of management functions for managing a lifecycle of the enabler and dependencies of the enabler;

receiving, by the application, a request from the first enabler via the management interface of the first enabler, the request comprising a request to perform management functions for managing the second enabler;

reading, by the application, metadata associated with the management interface of the second enabler, said metadata indicating a plurality of management functions that are available through the management interface of the second enabler, said metadata also indicating a plurality of management functions that are unavailable through the management interface of the second enabler, and said metadata also indicating alternative ways to perform the unavailable management functions, the plurality of management functions comprising at least a function for provisioning of the enablers;

determining, by the application, the management functions of the second enabler that are available or unavailable based on the metadata;

in response to determining the requested management function is available, requesting, by the application, the requested management function via the management interface of the second enabler; and in response to determining the requested management function is unavailable, identifying, by the application, one or more alternative functions based on the metadata indicating alternative ways to perform the unavailable requested management function and requesting the one or more alternative functions; and providing, by the application, the available management functions and the alternative functions of the second enabler to the first enabler for management.

7. The system of claim 6, wherein one of the requested management functions of the plurality of enablers comprises the function for provisioning of one or more enablers and the plurality of management functions further comprise one or more of a function for activation of the one or more enablers, a function for state monitoring of the one or more enablers, a function for usage monitoring of the one or more enablers, a function for health monitoring of the one or more enablers, a function for updating of the one or more enablers, or a function for de-activation of the one or more enablers.

8. The system of claim 6, wherein the metadata is defined consistent with an interface definition for the management interface and identifies one or more alternative functions for the requested management function.

9. The system of claim 8, wherein the one or more alternative functions are selected from a group consisting of calls to a management interface of another enabler, calls to a functional interface of another enabler, and a workflow.

10. The system of claim 6, wherein the metadata is stored in a metadata repository maintained by a supporting enabler.

11. A machine-readable memory having stored thereon a series of instructions which, when executed by a processor, cause the processor to manage a plurality of enablers by:

executing an application by a computer system;

executing the plurality of enablers by the computer system including a first enabler and a second enabler, wherein each enabler comprising:

a northbound interface providing an abstract, network agnostic interface providing notification of network events and for invoking one or more of a plurality of functions of a network resource, wherein the enabler is between the application and the network resource and wherein the application interacts with the network resource through the enabler, a southbound interface providing an interface specific to the network resource regardless of a network or protocol of the northbound interface, and a management interface comprising a business process definition providing an abstraction of a plurality of management functions for managing a lifecycle of the enabler and dependencies of the enabler;

receiving, by the application, a request from the first enabler via the management interface of the first enabler, the request comprising a request to perform management functions for managing the second enabler;

reading, by the application, metadata associated with the management interface of the second enabler, said metadata indicating a plurality of management functions that are available through the management interface of the second enabler, said metadata also indicating a plurality of management functions that are unavailable through the management interface of the second enabler, and said metadata also indicating alternative ways to perform the unavailable management functions, the plurality of management functions comprising at least a function for provisioning of the enablers;

determining, by the application, the management functions of the second enabler that are available or unavailable based on the metadata;

in response to determining the requested management function is available, requesting, by the application, the requested management function via the management interface of the second enabler; and in response to determining the requested management function is unavailable, identifying, by the application, one or more alternative functions based on the metadata indicating alternative ways to perform the unavailable requested management function and requesting the one or more alternative functions; and providing, by the application, the available management functions and the alternative functions of the second enabler to the first enabler for management.

* * * * *

UNITED STATES PATENT AND TRADEMARK OFFICE
CERTIFICATE OF CORRECTION

Page 1 of 1

PATENT NO. : 9,038,082 B2
APPLICATION NO. : 13/029219
DATED : May 19, 2015
INVENTOR(S) : Stephane H. Maes It is certified that error appears in the above-identified patent and that said Letters Patent is hereby corrected as shown below:

On the title page

Item 56 Other Publications, Column 2, Line 65: Delete "mialed" and insert --mailed--

In the specification

Column 5, Line 43: Delete "etc)." and insert --etc.).--

Column 9, Line 3: Delete "a the" and insert --the--

Column 13, Line 7: Delete "metadata" and insert --metadata.--

Column 13, Line 26: Delete "metadata" and insert --metadata.--

Column 18, Line 32: Delete "processes" and insert --processes.--

In the claims

Claim 1, Column 19, Line 35: Delete "system" and insert --system,--

Claim 6, Column 20, Line 44: Delete "system" and insert --system,--

Claim 11, Column 22, Line 1: Delete "system" and insert --system,--

Signed and Sealed this
Third Day of May, 2016

Michelle K. Lee
*Director of the United States Patent and Trademark Office*